US006081381A

United States Patent [19]

Shalapenok et al.

[11] Patent Number: 6,081,381

[45] Date of Patent: Jun. 27, 2000

[54] APPARATUS AND METHOD FOR REDUCING SPATIAL COHERENCE AND FOR IMPROVING UNIFORMITY OF A LIGHT BEAM EMITTED FROM A COHERENT LIGHT SOURCE

[75] Inventors: Andrey Shalapenok, Mountain View, Calif.; Ihar Hurevich, Saarbrucken, Germany; Dimitri Velikov, San Carlos, Calif.; James Ritter, Fremont, Calif.; Alexander Shkolnik, San Carlos, Calif.

[73] Assignee: Polametrics, Inc., Calif.

[21] Appl. No.: 09/178,783

[22] Filed: Oct. 26, 1998

[51] Int. Cl.[7] .......... G02B 27/10

[52] U.S. Cl. .......... 359/619; 359/620; 359/629; 359/642

[58] Field of Search .......... 359/619, 642, 359/620, 629; 355/67

[56] References Cited

U.S. PATENT DOCUMENTS

| | | | |
|---|---|---|---|
| 4,155,630 | 5/1979 | Ih | 359/707 |
| 4,256,363 | 3/1981 | Briones | 359/303 |
| 4,427,261 | 1/1984 | Khoe et al. | 385/38 |
| 4,511,220 | 4/1985 | Scully | 359/495 |
| 5,684,566 | 11/1997 | Stanton | 355/67 |

*Primary Examiner*—Georgia Epps
*Assistant Examiner*—Tim Thompson

[57] ABSTRACT

A method and apparatus for elimination of speckle pattern in optical system by reducing coherence. The invention is based on the use of a rotating microlens array having a rotational speed chosen with reference to laser parameter. For a continuous laser this relationship consists in that the exposure time is sufficient for overlapping at least $10^4$ spot sizes of the speckle. For a pulse laser, the laser pulse time should be sufficient for shifting the speckle spot at least by the magnitude of its diameter. Several embodiments with modified coherence reduction units are available. One modified embodiment describes a rotating inclined plate which enhances coherence reduction by scanning the over the surface of the diffuser. Another embodiment describes the use of an optical conical rod with total internal reflection for creation of a plurality of non-coherent light sources.

21 Claims, 5 Drawing Sheets

A
LB1
LB2
$21_1$
$LB_3$
$21_2$
$LB4_1$
$18_1$
$LB4_2$
$18_2$
O-O
22
10
LB
12
11
14
16
α
$21_n$
18
$LB4_n$
$18_n$
20
A

APPARATUS AND METHOD FOR REDUCING SPATIAL COHERENCE AND FOR IMPROVING UNIFORMITY OF A LIGHT BEAM EMITTED FROM A COHERENT LIGHT SOURCE

FIELD OF THE INVENTION

The present invention relates to the field of optics, in particular to an apparatus and a method for reducing spatial coherence and for improving uniformity of a light beam emitted from a coherent light source.

BACKGROUND OF THE INVENTION

When a light beam generated by a coherent light source passes through an optical system, it acquires a grain-like structure (so-called speckle structure) with 100% modulation of the light intensity, as well as nonuniformities associated with such phenomena as light interference. This phenomenon prevents such light from direct use, e.g., in image-forming systems. The aforementioned speckle structure is caused by diffraction of a coherent wavefront in the areas of external and internal (structural) heterogenuieties of optical system elements with subsequent interference of diffraction beams.

Coherence is correlation between the phases of two or more waves or between the phases of parts of a single wave so that interference effect may be produced between them.

Since the aforementioned micro- and macro-heterogenuieties cannot be completely eliminated, the only countermeasure that can be undertaken for the solution of the above problem is to reduce the depth of radiation modulation and the frequency of interference fringes by decreasing spatial coherence in the initial light beam. At the same time, it would be desirable to ensure uniform distribution of brightness in the cross section of the light beam in an object or illumination plane.

Many attempts have been made to solve the problem associated with the speckle structure. For example, U.S. Pat. No. 4,155,630 issued in 1979 to Charles Ih discloses a process and apparatus for improving image creation in a coherent light imagery system which involves directing a diffused light onto a mirror having a rocking motion that will cause the reflected rays to sweep a two-dimensional area and focusing the reflected light through a diffuser before collimating same for use in image creation. More particularly, this invention creates the rocking motion by applying a combination of voltages to three independent piezo-electric crystals upon which the mirror is mounted.

A disadvantage of the apparatus of U.S. Pat. No. 4,155,630 consists in that it utilizes piezo-elements which are expensive to manufacture, difficult to control and produce a limited shift insufficient to homogenize the light distribution.

U.S. Pat. No. 4,427,261 issued to Giok Khoe, et al. in 1984 describes an optical transmission system having reduced modal noise. In this device, an optical fiber is coupled to an end face of a semiconductor laser diode and the other end face is coupled to one end of a monomode optical waveguide. The other end of waveguide is terminated in a reflecting manner, e.g. by mirror, to reduce the spatial coherence length of the laser. According to the inventors, the speckle patterns are only produced in the transmission fiber over a short distance from the laser, and modal noise further on in the transmission fiber can be prevented by avoiding the use of non-ideal fiber couplings or other connections having a spatial filter effect within this short distance from the laser.

A disadvantage of the system is that, due to physical limitations inherent in mono-mode optical fiber, it is applicable only to semiconductor lasers and is unsuitable for more powerful wide-beam power sources, such as an excimer laser.

U.S. Pat. No. 4,511,220 issued in 1985 to Charles Scully discloses a laser target speckle eliminator with regard to laser light reflected from a distant target whose roughness exceeds the wavelength of the laser light. The apparatus includes a half plate wave member, a first polarizing beam splitter member, a totally reflecting right angle prism, and a second polarizing beam splitter member, all of which are in serial optical alignment, that are used in combination to convert a linearly (i.e., vertically) polarized light beam, which is emitted by a laser having a known coherence length, into two coincident, orthogonally polarized, beams that are not coherent with each other, and that have an optical path difference which exceeds the known coherence length of the emitting laser, to eliminate the speckle.

The main disadvantage of the apparatus of U.S. Pat. No. 4,511,220 is that splitting of the coherent light beam only into two components is insufficient for highly coherent lasers. Furthermore, this system does not improve uniformity at all.

U.S. Pat. No. 4,256,363 issued in 1981 to Robert Briones describes a speckle suppression of holographic microscopy in an apparatus of reconstructing and viewing a speckled holographic image through a microscope, with the result that the speckle of the holographic image is significantly reduced, without loss of resolution of the image. A finely-structured and transparent light diffuser is interposed through the aerial image formed by a hologram or an image formed or relayed by a lens system such as a microscope objective prior to the eyepiece. This diffuser is moved in its plane with a rotary or vibratory motion to suppress the speckle.

The principle described in U.S. Pat. No. 4,256,363 is applicable only to microscopic optical system with an extremely small field of view. In the case of large fields of view this system will not provide uniformity in the light distribution pattern. Another disadvantage of the aforementioned apparatus is that it utilizes a single-stage coherence reducing unit which is insufficient for suppressing coherence to a required degree.

OBJECTS OF THE INVENTION

It is an object of the present invention is to provide a method an apparatus for reducing spatial coherence and for improving uniformity of a laser beam which is inexpensive to manufacture, easy to control, provides high homogeneity of light distribution, is free of beam geometry and source power limitations, applicable to lasers of any type, splits the light beam into a plurality of independent mutually-incoherent components, and is not limited with regard to the size of the view field.

SUMMARY OF THE INVENTION

A method and apparatus for elimination of speckle pattern in optical system by reducing coherence. The invention is based on the use of a rotating microlens array having a rotational speed chosen with reference to parameters of the coherent light source, e.g., a laser. For a continuous laser this relationship consists in that the exposure time is sufficient for overlapping at least $10^4$ spot sizes of the speckle. For a pulse laser, the laser pulse time should be sufficient for shifting the speckle spot at least by the magnitude of its diameter. Several embodiments with modified coherence reduction units are available. One modified embodiment describes a rotating inclined plate which enhances coherence reduction by scanning the over the surface of the diffuser. Another embodiment describes the use of an optical conical rod with total internal reflection for creation of a plurality of non-coherent light sources.

Figure 1:
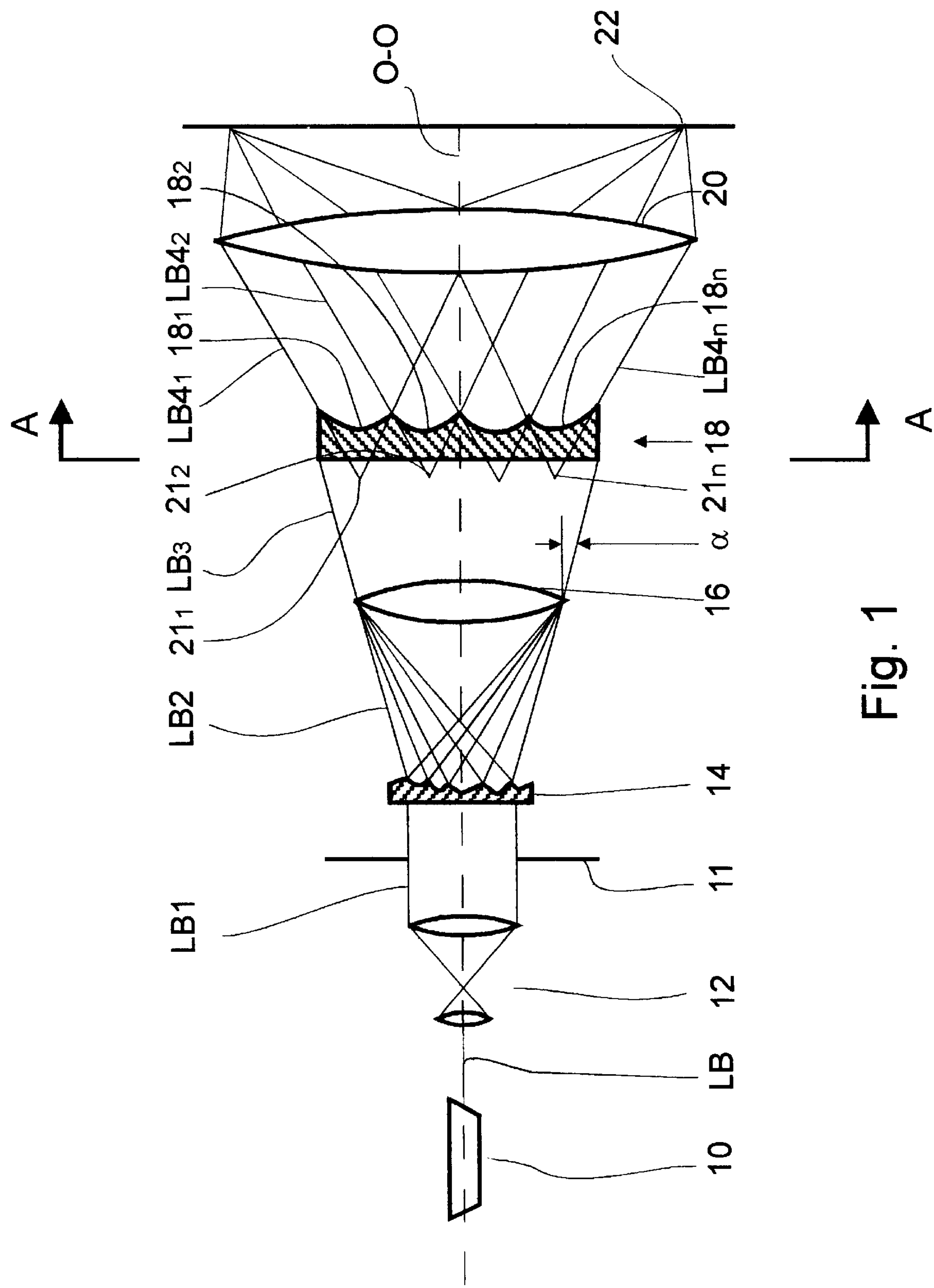
FIG. 1 is a schematic view of an illumination optical system of the invention with a speckle elimination unit in the form of a stationary diffuser and rotating microlense array.
Figure 2:
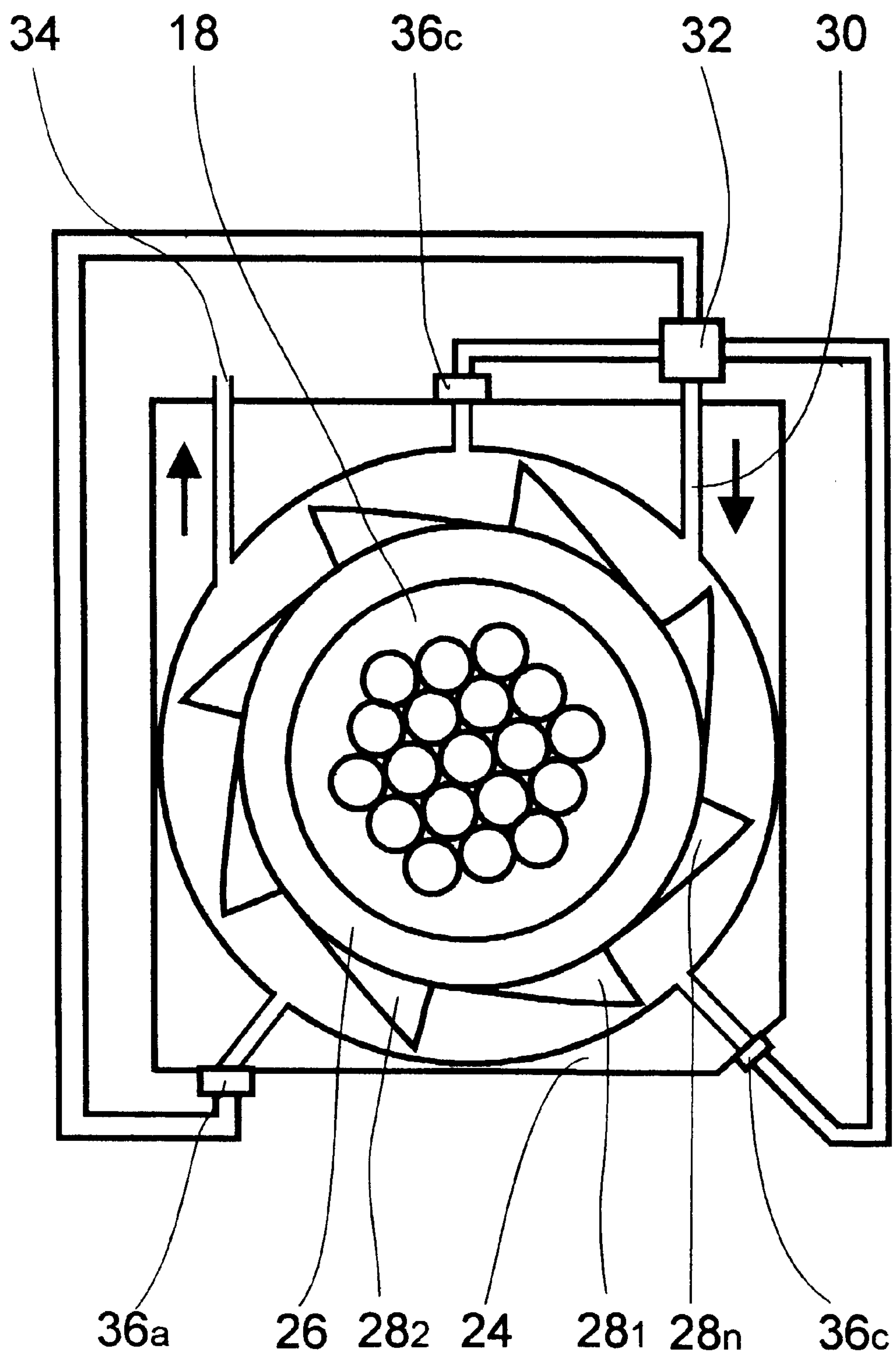
FIG. 2 is a sectional view along line A—A of FIG. 1.

FIGS. 1 and 2—Embodiment of the Apparatus with a Speckle Elimination Unit in the Form of a Stationary Diffuser and Rotating Microlense Array Since the principle of the invention is based on the use of so-called microlens array, it would be beneficial for better understanding of the optical system and method of the invention to provide a simplified explanation of microlens characteristics and performance.

In the field of optics, a micro-optical element such as a microlense is defined broadly is an optical component ranging in size from several millimeters to several micrometers. A plurality of such microlenses is called microlens array which can be formed either by assembling a plurality of individual microlenses into a single unit or by various technological processes such as photolithography or etching, from a single block of an optical material. Microlens arrays are commercially produced, e.g., by AMS Mikrooptik GmbH, Saarbrucken, Germany. In microlens array, each individual microlens generates independent image resulting in the generation of a multiplied image in the illumination plane.

Microlens arrays find practical application, e.g., in the manufacture of printed circuit boards, in laser medicine, micromachining, photocopying machines, scanners, printers, etc.

It should be noted that the following assumptions should be accepted in design of any coherent optical illumination system, including the one of the present invention:

Each pulse of light radiation fills the entire enter pupil of the optical system or a significant part thereof as uniformly as possible.

For uniform illumination simultaneously in two conjugated planes (illumination plane and pupil), the extended light source must have an essentially uniform intensity of light radiation from a unit surface and for all angles within the range of the aperture.

FIG. 1 is a schematic view of an apparatus of the invention for reducing coherence and for improving uniformity of a light beam utilizing a microlens array as a light homogenizing element between a collector and condenser lenses.

The apparatus of the invention does not include a light source and is intended for use as an attachment to existing coherent light sources. However, for the sake of convenience of description, in the subsequent embodiments of the invention shown and described with reference to FIGS. 1 through 5, the coherent light source will be mentioned as a laser light source and shown as an element of the apparatus.

As shown in FIG. 1, the apparatus consists of the following optical elements arranged in sequence along a common optical axis O—O of the optical system: a laser source 10, a shutter 11, a beam modifier 12, a light diffuser 14, a collector lens 16, a moving microlens array 18, and a condenser lens 20. Microlens array 18 consists of a plurality of microlenses $\mathbf{18}_1$, $\mathbf{18}_2$ . . . $\mathbf{18}_n$. Depending on specific application, diameters of microlenses $\mathbf{18}_1$, $\mathbf{18}_2$ . . . $\mathbf{18}_n$ may vary within the range of hundreds micrometers to several millimeters. In FIG. 1, reference numeral 22 designates; an illumination plane where the final homogenous light distribution is obtained.

More detailed description of constructions and functions of separate elements of the aforementioned optical system will now be given.

Laser source 10 may be of any existing type such as a continuous or pulsed laser, a single or multimode laser, and a laser with any types of active media such as gas, solid-state, semiconductor, etc. There are no limitations with regard to a pulse energy, average power, shape, size, and a wavelength of the laser beam. In other words, the apparatus and method of the invention are entirely universal with regard to the type of laser source 10.

Laser source 10 generates an initial laser beam LB.

Shutter 11 is a device which periodically opens the access of laser beam LB to the optical system, thus determining the exposure time. What is meant under the term "exposure time" is the time during which the image is projected onto a photosensitive material or is transmitted to a photoreceiver for a required photochemical or photoelectronic reaction.

Shutter 11 may be a part of laser or an optical system which exists beyond the apparatus of the invention. Therefore the apparatus of the invention may or may not to include shutter 11.

Laser beam LB enters a beam modifier 12 which is an optional element. The use of beam modifier 12, however, improves efficiency and flexibility of the optical system. Beam modifier 12 modifies the shape and size of laser beam LB. In the embodiment of FIG. 1, beam modifier 12 is shown in the form of a telescope which is composed of spherical or cylindrical lenses (not shown) to form a light spot of a required shape and size on diffuser 14. Beam modifier may be represented by optical elements of the type other than a telescope, e.g., such as beam modifier or a microlens array, or an inclined rotating plate (which are shown hereinafter with reference to other embodiments of the present invention). From beam modifier 12, a modified beam LB1 propagates further onto diffuser 14.

Diffuser 14 is an element which creates a given aperture (angle of beams) and introduces random phase heterogenuieties into the wave front, thus decreasing its coherence. Diffuser 14 mixes light beam and improves its uniformity in the beam cross section. It transforms light beam LB1 into a diverging beam LB2 which is partially incoherent and propagates further to collector lens 16.

Collector lens 16, in turn, transforms diverging light beam LB2 into a substantially parallel light beam LB3 with a limited divergence angle $\alpha$ which can be adjusted by selecting a focal distance of the collector lens 16. Substantially parallel light beam LB3 passes through microlens array 18 to condenser 20. p The construction of microlens array 18 was described earlier. In the apparatus of the invention, this element of the optical system splits parallel light beam LB3 into a plurality of independent beams LB$4_1$, LB$4_2$ . . . LB$4_n$. The incoherence inherent in these individual beams LB$4_1$, LB$4_2$, . . . LB$4_n$, due to incoherence of beam LB2, will be further enhanced by individual phase nonuniformities of microlenses of array 18. Furthermore, microlens array 18 creates in its focal plane (not shown) a plurality of secondary point light images $21_1$, $21_2$, . . . $21_n$ of individual beams LB$4_1$, LB$4_2$, . . . LB$4_n$. These light images function as secondary light sources. The number of these secondary light sources is equal to the number of microlenses in lens array 18.

Microlens array 18 is made in the form of a disk which is rotatingly installed, e.g., in a housing 24 on a rotation axis (not shown). In accordance with one embodiment of the invention, the rotation drive device is made in the form of an impeller bushing 26. Microlens array 18 is inserted into impeller bushing 26 and is rigidly fixed in it for joint rotation therewith. Impeller bushing 26 has turbine blades 28*a,* 28*b* . . . 28*n* on its periphery and is driven into high-speed rotation, e.g., by supplying compressed air via a nozzle 30 from an air compressor 32. The air is removed via an exhaust port 34.

Rotation of lens array 18 converts the set of secondary point sources into a set of concentric circles, thus further contributing to illumination uniformity. Rotation further averages in time the random phase heterogenuieties of the microlens array, thus decreasing contrast in the speckle structure (modulation of intensity).

In order to prevent friction between impeller bushing 26 and the inner walls of housing 24 and in order to ensure centering and floating of impeller bushing inside housing 24 during starting and rotation of impeller bushing, housing 24 is provided with three auxiliary nozzles 36*a,* 36*b,* and 36*c* which are uniformly spaced in the circumferential direction. Although three such nozzle are shown, their number may be different, e.g. four or more.

In order to eliminate speckles in most efficient way, the speed of rotation of impeller bushing 26 together with microlens array 18 should be selected with reference to the size $\delta$ of the element speckle structure and the type of the laser source, in particular the duration $\tau$ of the laser pulse.

More specifically, as has been mentioned above, the speckle structure is generated by surfaces and structural (internal) microheterogenuieties. In the context of the present invention, the size $\delta$ of the speckle element means an average diameter of the speckle light spot. It can be expressed by the following formula:

$$\delta \approx \lambda / A,$$

where $\lambda$ is a wavelength of the laser beam, and A is an aperture of the optical system, which in the case of the system of FIG. 1 is an aperture of condenser 20.

For highly coherent lasers (such as a continuous single-mode laser, a pulsed solid-state laser), the speckle structure has a 100%-modulated intensity.

In order to obtain a speckle-unmodulated image of an object in an illumination plane, it is required to average a certain amount of pulses during the exposure time so that the speckle structure generated by each pulse be shifted at least by the magnitude $\delta$ of the speckle itself. If the number of pulses is high, e.g., in the case of a solid-state quasicontinuous laser with a frequency of about 10 kHz and the exposure time of about 0.5 sec, i.e., with the frequency of about $5\times10^5$, the shift may have a smaller magnitude. This is because the averaging time is sufficiently long (the shift occurs also during the time of the pulse itself since in this laser the pulse is relatively long, e.,g., about 100 $\mu$sec).

Similar situation occurs in continuous lasers. The speed of rotation should be coordinated only with the exposure time by apriori setting the averaging number.

The situation is much worse with lasers which have low frequency of pulses and short duration of the pulses. An example of such a light source is an excimer-type laser (i.e., the laser which uses as its working medium a substance formed by molecules or atoms connected only in an excited state). Such lasers have a frequency of about 200 to 400 Hz, and pulse time of about 10 $\mu$sec. The exposure time $\tau$ is sufficient only for 20 to 100 pulses so that during the pulse time the speckle structure cannot be practically shifted. This is because for the excimer lasers the linear speed V obtained during rotation should be equal to $$V=\delta/\tau=\lambda/A\tau=2\lambda/\tau=(0.2\cdot2\cdot10^{-3}\ mm)/10^{-9}\ sec=$$

$$=0.4\cdot10^{-3}/10^{-9}=0.4\cdot10^{6}\ mm/sec.$$

It is understood that if the axis of rotation passes through the center of the rotating microlens array, such high speed is practically unattainable.

Thus, it can be understood that the speckle-eliminating speed of rotation of microlens array 18 will be different for different types of laser. Moreover, since individual microlenses $18_1$, $18_2$, . . . $18_n$ are located on different radii from the center of rotation, they will have different linear speeds, and therefore the shift of speckle spots reproduced by microlenses located on different radii will be different, i.e., significant near the periphery of microlens array and reduced closer to the center of rotation. For practical purposes, the aforementioned speed of rotation should be selected with reference to the centrally located microlenses which operate under worse conditions than the peripheral microlenses. It is even recommended to completely close the central microlens or even a certain range of central lenses, e.g., within the range of 10% of the diameter of microlens array 18.

Our experience showed that for lasers of all types, satisfactory results in the speckle elimination procedure can be achieved with the averaging number of about as $10^3$ to $10^4$. What is meant under the term "averaging number" is the number of time periods during which each speckle spot is shifted for a distance approximately equal to its size $\delta$.

Since the speckle structure should be shifted in the illumination plane rather than on the raster or diffuser, it become possible for various purposes to change in a wide range the raster pitch and the surface roughness of the diffuser.

The last optical element which is located between microlens array 18 and illumination plane 22 is condenser lens 20. Condenser 20 aligns microbeams emitted from each individual secondary point light sources $21_1$, $21_2$, $21_n$ into a common illuminated area with uniform light distribution which is free of speckles.

Having described the construction of the optical system and the functions of its elements, we can now describe the operation of the system as a whole.

When laser source 10 is initiated, it generates laser beam LB which is periodically passed through shutter 11 to beam modifier 12 and then pass sequentially through the subsequent elements of the optical system, i.e., light diffuser 14, collector lens 16, moving microlens array 18 and a condenser lens 20. More specifically, in beam modifier 12 the shape and size of laser beam LB is modifies in accordance with specific requirements. For example, the cross-sectional shape of laser beam LB may be modified from circular to a rectangular shape, or vice verse. The beam is then passes to diffuser 14 which mixes light beam and improves its uniformity in the beam cross section. It transforms light beam LB1 into a diverging beam LB2 which is partially incoherent and propagates further to collector lens 16. Collector lens 16 further transforms diverging light beam LB2 into a substantially parallel light beam LB3 with a limited divergence angle $\alpha$ which can be adjusted by selecting a focal distance of the collector lens 16. Substantially parallel light beam LB3 passes through microlens array 18 to condenser 20.

Microlens array 18 is rotated by supplying compressed air via a nozzle 30 from an air compressor 32 to impeller blades 28*a*, 28*b* . . . 28*n*. In combination with condenser 20, rotating microlens array 18 forms on illumination plane 22 a uniformly illuminated area (not shown) which is free of speckles due to the speckle averaging procedure which took place during the exposure time. As has been described above, microlens array 18 rotates with the speed selected with reference to the parameters described above. For most practical applications this speed falls into the range of $10^4$ to $4\times10^4$ rpm.

If, as has been described earlier, the laser pulse duration is too short (e.g., in the case of an excimer laser), the effect of the speckle elimination still can be achieved by rotating diffuser 14 in the direction opposite to the rotation of microlens array 18.

Figure 3:
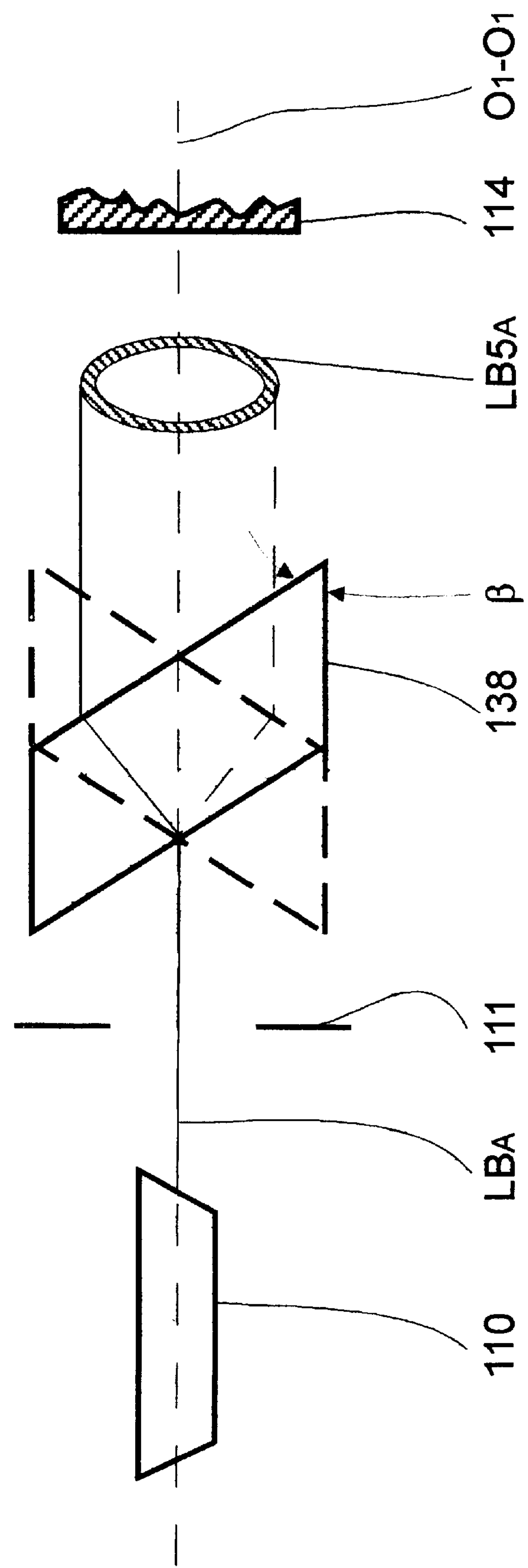
FIG. 3 is a schematic view of an illumination optical system of the invention with the beam modifier in the form of a rotating inclined plane-parallel transparent plate.

FIG. 3—Embodiment of the Apparatus with Beam Modifier in the Form of a Rotating Inclined Plane-Parallel Transparent Plate FIG. 3 relates to an apparatus of the invention which in general is identical to the shown in FIGS. 1 and 2, except for the beam modifier. Therefore some parts of the apparatus are omitted from FIG. 3 which illustrates only a modifier 138 and units associated therewith.

Shown in FIG. 3 are a laser 110 which generates an initial laser beam $LB_A$, a shutter 111, modifier 138 having a construction different from modifier 38 of FIG. 1, and a diffuser 114.

In this embodiment, the beam modification effect is achieved by utilizing a rotating inclined plane-parallel transparent plate 138. This plate shifts initial beam $LB_A$ away from optical axis $O_1$—$O_1$ and parallel to it. As a result, the cross section of beam $LB5_A$ which is obtained after passing through beam modifier 138 acquires an annular configuration, i.e., with a reduced density of light in the vicinity of optical axis $O_1$—$O_1$. The thickness and angle $\beta$ of inclination of plate 138 determine the cross-sectional shape of beam $LB5_A$. For practical purposes, angle $\beta$ may vary within the range of 20 to 60°, and the thickness of plate 138 may vary from 2 to 10 mm. Plate rotates with a speed of 1000 to 5000 rpm and may be driven into rotation by means of the same impeller bushing (not shown) as impeller bush 26 of FIG. 1 using the same compressor 32.

Since inclined plate 138 rotates, the light beam $LB5_A$ rotates with respect to the surface of stationary diffuser 114. This is because at different moments of time rotating beam $LB5_A$ scans different area on the surface of diffuser 114. This introduced an additional phase shift thus further contributing to decrease in coherence. In contrast to this, in the embodiment of FIGS. 1 and 2, beam $LB_1$ constantly passed through the same surface area of diffuser 14.

If, as has been described earlier, the laser pulse duration is too short (e.g., in the case of an excimer laser), the effect of the speckle elimination still can be achieved by rotating diffuser 114 in the direction opposite to the rotation of inclined plate 138.

Figure 4:
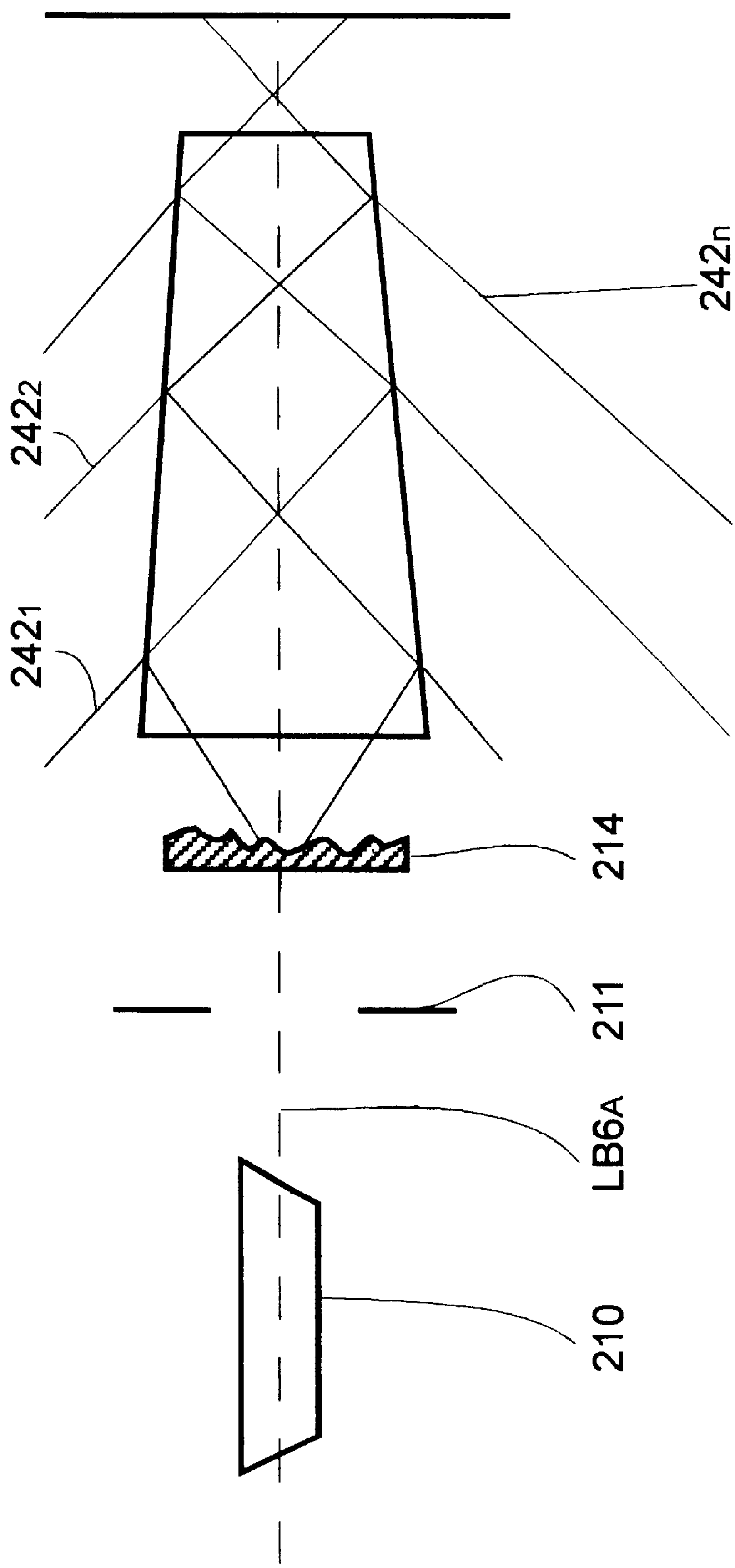
FIG. 4 is a schematic view of an illumination optical system of the invention which incorporates additional speckle elimination elements in the form of cylindrical or conical optical rods.

FIG. 4—Embodiment of the Apparatus with Additional Speckle Elimination Element in the Form of Conical Optical Rod FIG. 4 relates to an apparatus of the invention which in general is identical to the shown in FIGS. 1 and 2, except for the beam modifier. Therefore some parts of the apparatus are omitted from FIG. 4 which illustrates only a modifier 238 and units associated therewith.

Shown in FIG. 4 are a laser 210 which generates an initial laser beam $LB6_A$, a shutter 211, modifier 238 having a construction different from modifier 38 of FIG. 1 and 138 of FIG. 3, and a diffuser 214.

In this embodiment, the beam modification effect is achieved by utilizing an effect of total internal reflection in a conical optical rod 238. Since beam $LB7_A$, which is formed after beam $LB_6$ passed through diffuser 214, propagates through conical optical rod 238 with multiple internal reflection from its surface, this introduced an additional phase shift thus further contributing to decrease in coherence. In contrast to this, in the embodiment of FIGS. 1 and 2, the optical path of beam $LB_1$ remains unchanged.

Within the limits which preserves the angle of total internal reflection, the value of angle $\gamma$ of divergence of output beam $LB8_A$ can be adjusted either by changing the tapering angle $\theta$ of conical optical rod 238 or by changing the divergence angle of beam LB7A. Conical optical rod 238 with multiple reflections creates an effect of a plurality of independent secondary light sources $242_1$, $242_2$ . . . $242_n$.

If, as has been described earlier, the laser pulse duration is too short (e.g., in the case of an excimer laser), the effect of the speckle elimination still can be achieved by rotating diffuser 214 in the direction opposite to the rotation of the microlens array (not shown in FIG. 4).

Figure 5:
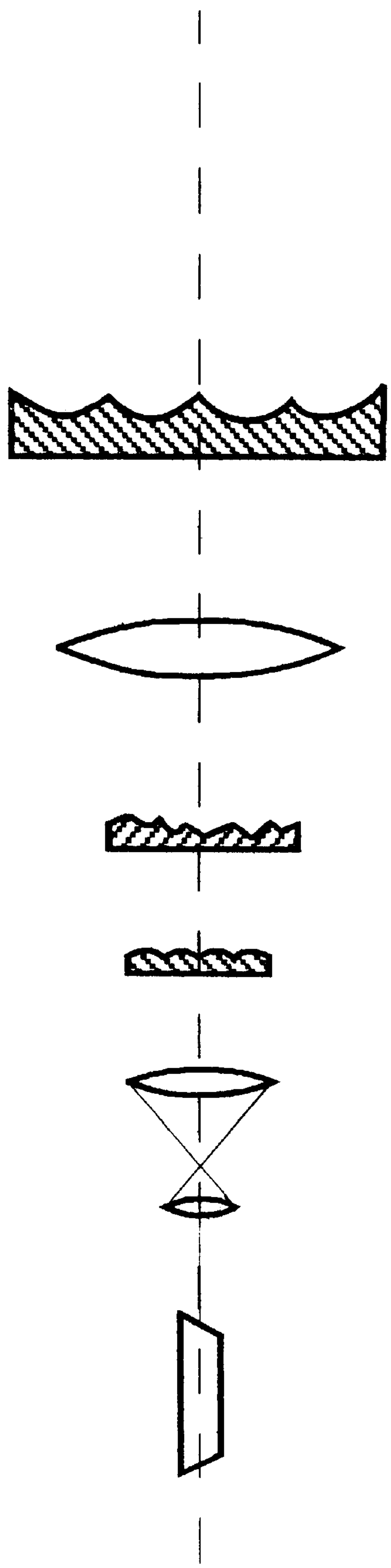
FIG. 5 is a schematic view of an illumination optical system of the invention with an additional microlens array between the beam modifier and diffuser.

FIG. 5—Embodiment of the Apparatus with an Additional Microlens Array and Matching Unit Between the Beam Modifier and Diffuser FIG. 5 relates to an apparatus of the invention which in general is identical to the shown in FIGS. 1 and 2, except for an additional microlens array 313 and a matching unit 317 located between a beam modifier 312 and a diffuser 314. Therefore some parts of the apparatus are omitted from FIG. 5 which illustrates only an additional microlens array 313 and units associated therewith.

Shown in FIG. 5 are a laser 310 which generates an initial laser beam $LB_A$, a shutter 311, additional microlens array 313, matching unit 317, diffuser 314, and main microlens array 318.

In this embodiment, additional microlens array 313 consists of microlenses $313_1$, $313_2$ . . . $313_n$ which are 2 to 5 times smaller in diameter than microlenses $18_1$, $18_2$, . . . $18_n$ of main microlens array 18 (FIG. 1). In contrast to main microlens array 18, additional microlens array 313 may be stationary if the rotation of main microlens array is sufficient for speckle elimination. If, as has been described earlier, the laser pulse duration is too short for displacing the speckle spot at least for the size of its diameter (e.g., in the case of an excimer laser), it may be driven into rotation by using an additional impeller bushing (not shown) supplied by compressed air from air compressor 32. If even the rotation of additional microlens array 313 is insufficient for the fulfillment of the aforementioned condition, the effect can be achieved by rotating diffuser 314. It is recommended that in this embodiment diffuser 314 and main microlens array 318 rotate in mutually opposite directions.

Matching unit 317 is intended for matching optical parameters of additional microlens array 313 with those of main microlens array 318. These optical parameters are a diameter of illumination field and angles of beams (not shown). Matching unit 317 consists, e.g., of at least two lenses 317_a_ and 317_b_ combined into a telescope which transmits beam $LB_{11}$, obtained after passing beam $LB_{10}$ via additional microlens array 313, to diffuser 314.

Thus it has been shown that the invention provides a method and apparatus for reducing spatial coherence and for improving uniformity of a laser beam which is inexpensive to manufacture, easy to control, provides high homogeneity of light distribution, is free of beam geometry and source power limitations, applicable to lasers of any type, splits the light beam into a plurality of independent mutually-incoherent components, and is not limited with regard to the size of the view field.

Although the invention has been shown in the form of specific embodiments with reference to specific configurations and materials, it is understood that these configurations and materials were given only as examples and that any changes and modifications are possible, provided they do not depart from the scope of the appended claims. For example, the microlens arrays may be rotated by means other than air turbine, e.g., by an electric motor, a piezo-electric drive, etc. The microlenses of the array were shown as plano-concave lenses. It is understood that microlenses of any other type, such as double-convex or plano-convex lenses, etc., are applicable for the purposes of the invention. The condenser and collector are shown in the form of single lenses. However, these device may have a composite construction. A beam modifier and a matching unit were shown as a two-lens constructions. These devices, however, may be made in the form of more complicated multiple-component units. The conical optical rod was shown as a solid body. It can be made in the form of a tube the inner surface of which is coated a light reflecting material. The rotation movement of the microlense array may be replaced by high-speed oscillations of the array. Although in the description of preferred embodiments was made with reference to a laser, it is understood that the invention is applicable to any coherent light source such as synchrotron, ondulator, or the like.

What is claimed is:

1. A method for eliminating speckle structures formed by speckle spots in an illumination plane of an optical system having a coherent light source by reducing spatial coherence of illumination, comprising:

providing at least one microlens array, which consists of a plurality of microlenses, in the optical path between said coherent light source and said illumination plane;

igniting said coherent light source for generating a light beam;

moving said at least one microlens array with the speed sufficient for introducing phase heterogeneity in the light wavefront for speckle elimination;

passing said light beam through said rotating microlens array;

and creating a speckle-free and uniform light distribution in said illumination plane, said coherent light source being a continuous laser which operates during an exposure time and wherein said rotation averages said speckle structures during said exposure time.

2. The method of claim 1, wherein said movement overlaps at least $10^4$ of said speckle spots during said exposure time.

3. The method of claim 1, wherein said coherent light source is a pulse laser having the laser pulse time during which said speckle spots are shifted at least by the magnitude of their diameters.

4. An apparatus for eliminating speckle structures formed by speckle spots in optical system having a coherent light source by reducing spatial coherence of illumination, said apparatus comprising:

an illumination plane illuminated by a light beam generated by said coherent light source; and at least a diffuser for randomizing the wavefront of said light beam and a moving microlens array consisting of a plurality of microlenses, said diffuser and said moving microlense array being arranged sequentially in the direction of the propagation of said wavefront between said coherent light source and said illumination plane, each of said microlenses creating an individual point secondary light source which emits a microbeam toward said illumination plane;

a beam modifier which modifies the shape and size of said light beam and is located between said coherent light source and said diffuser;

a shutter located between said coherent light source and said diffuser for periodically opening an access of said light beam to said optical system;

a collector lens located between said diffuser and said moving microlens array for transforming said light beam from a diverging beam into a substantially parallel light beam; and a condenser which aligns said microbeams into a common illumination area with uniform light distribution.

5. The apparatus of claim 4, wherein movement of said moving microlens array is rotation, said apparatus further comprising means for rotating said moving microlens array with the speed sufficient for introducing phase heterogeneity in the laser wavefront of said light beam for speckle elimination.

6. The apparatus of claim 5, wherein said coherent light source is a continuous laser which operates during an exposure time and wherein said rotation averages said speckle structures during said exposure time.

7. The apparatus of claim 6, wherein said rotation overlaps at least $10^4$ of said speckle spots during said exposure time.

8. The apparatus of claim 6, wherein said beam modifier comprises a rotating inclined plane-parallel transparent plate between said coherent light source and said diffuser; said apparatus further comprising an additional rotating means for rotating said inclined plane-parallel transparent plate.

9. The apparatus of claim 8, wherein said inclined plane-parallel transparent plate having an angle of inclination to the direction of said optical path within the range of 20 to 60° and speed of rotation of said additional rotating means within the range of 1000 to 5000 rpm.

10. The apparatus of claim 9, wherein the thickness of said inclined plane-parallel transparent plate is within the range of 2 to 10 mm.

11. The apparatus of claim 8, wherein said coherent light source is a continuous laser which operates during an exposure time and wherein said rotation averages said speckle structures during said exposure time.

12. The apparatus of claim 10, wherein said rotation overlaps at least $10^4$ of said speckle spots during said exposure time.

13. The apparatus of claim 8, wherein said coherent light source is a pulse laser having the laser pulse time during which said speckle spots are shifted at least by the magnitude of their diameters.

14. The apparatus of claim 4, wherein said beam modifier comprises a conical optical rod, said light beam entering said conical optical rod at an angle which provides total internal reflection of said light beam during propagation through said conical optical beam.

15. The apparatus of claim 14, wherein said coherent light source is a continuous laser which operates during an exposure time and wherein said rotation averages said speckle structures during said exposure time.

16. The apparatus of claim 15, wherein said rotation overlaps at least $10^4$ of said speckle spots during said exposure time.

17. The apparatus of claim 14, wherein said coherent light source is a pulse laser having the laser pulse time during which said speckle spots are shifted at least by the magnitude of their diameters.

18. The apparatus of claim 4, further comprising an additional microlens array and a matching unit in said optical path between said beam modifier and said diffuser, said matching unit comprising at least two lenses combined into a telescope and serving to match optical parameters of said additional microlens array with those of said moving microlens array.

19. The apparatus of claim 18, wherein said coherent light source is a continuous laser which operates during an exposure time and wherein said rotation averages said speckle structures during said exposure time.

20. The apparatus of claim 18, wherein said rotation overlaps at least $10^4$ of said speckle spots during said exposure time.

21. The apparatus of claim 20, wherein said laser is a pulse laser having the laser pulse time during which said speckle spots are shifted at least by the magnitude of their diameters.

* * * * *